US008261862B2

(12) United States Patent
Uchiyama

(10) Patent No.: US 8,261,862 B2
(45) Date of Patent: Sep. 11, 2012

(54) DRIVE APPARATUS FOR VEHICLE

(75) Inventor: Naoki Uchiyama, Hamamatsu (JP)

(73) Assignee: Kabushiki Kaisha Atsumitec, Hamamatsu-Shi (JP)

( * ) Notice: Subject to any disclaimer, the term of this patent is extended or adjusted under 35 U.S.C. 154(b) by 247 days.

(21) Appl. No.: 12/377,997

(22) PCT Filed: May 25, 2007

(86) PCT No.: PCT/JP2007/060704
§ 371 (c)(1),
(2), (4) Date: Feb. 18, 2009

(87) PCT Pub. No.: WO2008/020502
PCT Pub. Date: Feb. 21, 2008

(65) Prior Publication Data
US 2010/0243347 A1   Sep. 30, 2010

(30) Foreign Application Priority Data
Aug. 18, 2006  (JP) ................................ 2006-223215

(51) Int. Cl.
*B60W 10/08* (2006.01)
(52) U.S. Cl. ............................... 180/65.265; 180/65.285
(58) Field of Classification Search ......... 180/65.1–65.8
See application file for complete search history.

(56) References Cited

U.S. PATENT DOCUMENTS

| | | | |
|---|---|---|---|
| 5,960,897 A | | 10/1999 | Furuya et al. |
| 6,595,308 B2* | | 7/2003 | Bowen ......................... 180/65.6 |
| 7,028,795 B2* | | 4/2006 | Tabata ........................ 180/65.21 |
| 7,235,322 B2* | | 6/2007 | Akikusa et al. ................ 429/425 |
| 7,798,269 B2* | | 9/2010 | Makuta et al. ................ 180/68.5 |
| 7,870,723 B2* | | 1/2011 | Elwart et al. ..................... 60/286 |
| 2006/0216559 A1* | | 9/2006 | Olivier et al. .................... 429/26 |

FOREIGN PATENT DOCUMENTS

| | | |
|---|---|---|
| JP | 05-111101 A | 4/1993 |
| JP | 10-067243 A | 3/1998 |

(Continued)

OTHER PUBLICATIONS

English Language International Search Report dated Aug. 14, 2007 issued in parent Appln. No. PCT/JP2007/060704.

(Continued)

*Primary Examiner* — Jeffrey J Restifo
*Assistant Examiner* — Erez Gurari
(74) *Attorney, Agent, or Firm* — Holtz, Holtz, Goodman & Chick, PC

(57) ABSTRACT

A drive apparatus for a vehicle, which supplies more electric power to a motor which supplements the drive power of an engine and collects energy from an exhaust to be able to improve fuel consumption and reduce the total amount of the exhaust, is realized by comprising an engine coupled to a drive wheel to generate drive power for the vehicle, a generator motor coupled to an output shaft of the engine and the drive wheel, a battery, a power control unit, and a power generation unit which generates electric power using an exhaust of the engine, and selects a charge mode when the vehicle is braked and when an engine output is equal to or greater than an output needed to drive the vehicle, wherein the electric power generated by the generator is stored in the battery, and energy is collected from the exhaust using the power generation unit.

9 Claims, 9 Drawing Sheets

FOREIGN PATENT DOCUMENTS

| | | |
|---|---|---|
| JP | 2002-175824 A | 6/2002 |
| JP | 2005-151633 A | 6/2005 |
| JP | 2005-166539 A | 6/2005 |
| WO | WO 2005/029629 A2 | 3/2005 |
| WO | WO 2005/063559 A1 | 7/2005 |

OTHER PUBLICATIONS

Japanese Office Action dated Jul. 27, 2011 in counterpart Japanese Application No. 2010-26812.

* cited by examiner

J3+J5 = J1+J6

J2+J5 = J4+J6

J2 + J5 = J4 + J6

J5 = J4 + J6

DRIVE APPARATUS FOR VEHICLE

This application is a U.S. National Phase Application under 35 USC 371 of International Application PCT/JP2007/060704 filed May 25, 2007.

TECHNICAL FIELD

The present invention relates to a drive apparatus for a so-called hybrid vehicle, which uses both an internal combustion engine (engine) and a generator motor as a drive apparatus.

BACKGROUND ART

A hybrid vehicle (which may hereinafter be mentioned as "vehicle"), which uses both an engine and a generator motor as a drive apparatus, carries out regenerative braking to operate the generator motor as a generator at the time of braking, and stores electric power generated in the regenerative braking in a battery. At the time of running and acceleration, the generator motor operates as an electric motor (motor) upon reception of electric power supplied from the battery, thereby assisting insufficiency of the engine output (e.g., Patent Document 1). Such a conventional drive apparatus does not discharge the regenerative braking energy at the time of braking as heat, but stores it in the battery to be used as drive energy at the time of driving and acceleration. Accordingly, the hybrid vehicle can improve the fuel consumption and reduce the total amount of the combusted exhaust gas.

The generator motor which operates as a generator may be simply called a generator, and the generator motor which operates as a motor may be simply called a motor herein.
Patent Document 1: Japanese Unexamined Patent Publication No. 2005-151633

However, while the conventional drive apparatus can charge the battery at the time of braking, it cannot carry out rotational driving of the generator to acquire electric power when the motor is assisting the engine. At the time of idling, electric power for charging the battery cannot be acquired. In addition, the motor in the hybrid vehicle often assists the engine for keeping running or for acceleration or the like. Therefore, the conventional drive apparatus which converts the kinetic energy of the vehicle to electric power and stores the electric power cannot sufficiently store electric power needed to drive the motor. Because the conventional drive apparatus discharges a combusted exhaust gas which contains a substance to be used as fuel and has heat energy, it is insufficient to improve the fuel consumption of the vehicle and reduce the total amount of the combusted exhaust gas (total amount of harmful substances contained in the combusted exhaust gas).

DISCLOSURE OF INVENTION

The present invention has been made to solve the problems described above, and it is an object of the invention to provide a drive apparatus for a vehicle, which can supply a motor with electric power acquired by a power generation unit using a combusted exhaust gas as a fuel gas, or, in addition to the electric power acquired by the power generation unit, electric power acquired using the heat energy of the combusted exhaust gas, and store the electric power thus acquired in a battery, thereby achieving a further improvement on fuel consumption and reduction of the total amount of the combusted exhaust gas.

To achieve the object, according to the present invention, there is provided a drive apparatus for a vehicle, comprising an engine to be coupled to a drive wheel of the vehicle to generate drive power for the vehicle, a generator motor to be coupled to an output shaft of the engine and the drive wheel, a battery, and a power generation unit electrically connected to a power control unit and the battery, and having a fuel cell which is disposed in a passage of a combusted exhaust gas exhausted from the engine (exhaust gas passage) to use the combusted exhaust gas as fuel. The power control unit selects a charge mode when the vehicle is braked and when the engine generates an output equal to or greater than an output needed to drive the vehicle, and stores the electric power generated by the generator in the battery. The power control unit selects an assist mode when the output of the engine is less than the output needed to drive the vehicle and drives the motor with the battery to compensate for the shortage of the engine output.

The drive apparatus for a vehicle according to the present invention may be configured in such a way that a power generation unit having a fuel cell using a combusted exhaust gas as a fuel gas and heat generating means which generates electric power with the heat energy of the combusted exhaust gas is used as the power generation unit disposed in the exhaust gas passage to drive the motor together with the battery, and the battery is charged even in the assist mode and at the time of idling in which the generator cannot charge the battery. If a single cell type solid oxide fuel cell is used as the fuel cell, the single cell type solid oxide fuel cell generates electric power using CHx or COx contained in the combusted exhaust gas as a fuel gas when the single cell type solid oxide fuel cell is heated by a high-temperature combusted exhaust gas and the temperature of the single cell type solid oxide fuel cell rises up to a power generation start temperature, thus making it possible to acquire electric power from a combusted exhaust gas with a simple configuration. In addition, the use of the heat generating means employing the Seebeck effect can allow the drive apparatus for a vehicle according to the present invention to convert the heat energy of a high-temperature combusted exhaust gas to electric power with a simple configuration. The heat generating means can be realized by using, for example, a junction portion where a P type thermoelectric transducing member and an N type thermoelectric transducing member are connected.

In particular, a vehicle to which the drive apparatus for a vehicle according to the present invention is adapted is a four-wheel drive vehicle, and one of a couple of front drive wheels or a couple of rear drive wheels are driven by the engine, and the other couple of drive wheels are driven by the generator motor.

Alternatively, a vehicle to which the drive apparatus for a vehicle according to the present invention is adapted is provided as a three-wheeled vehicle having a steered wheel which sets a moving direction of the vehicle, and a couple of drive wheels, and one of the couple of drive wheels is driven by the engine, and the other one of the drive wheels is driven by the generator motor.

In the drive apparatus for a vehicle according to the present invention, even when the motor is assisting the engine or the generator cannot charge the battery, the power generation unit disposed in the exhaust gas passage of the engine can acquire electric power from the combusted exhaust gas to charge the battery. Further, the drive apparatus for vehicle according to the present invention can supply greater electric power to the motor from the battery in assist mode, and can therefore achieve further reduction of fuel consumption and further reduction of the total amount of the combusted exhaust gas. In addition, the drive apparatus for a vehicle according to the present invention can realize a drive apparatus for a vehicle which obtains the foregoing effects even with a simple configuration by using a power generation unit in which a single cell type solid oxide fuel cell is employed, or by using a power generation unit in which a single cell type solid oxide fuel cell and Seebeck-effect based heat generating means are employed.

BEST MODE FOR CARRYING OUT THE INVENTION

A drive apparatus for a vehicle according to the present invention will be described below with reference to the accompanying drawings. FIGS. 1 to 5 show one embodiment of the drive apparatus for a vehicle according to the present invention, but the present invention is not limited by the diagrams.

<Configuration of Drive Apparatus>

Figure 1:
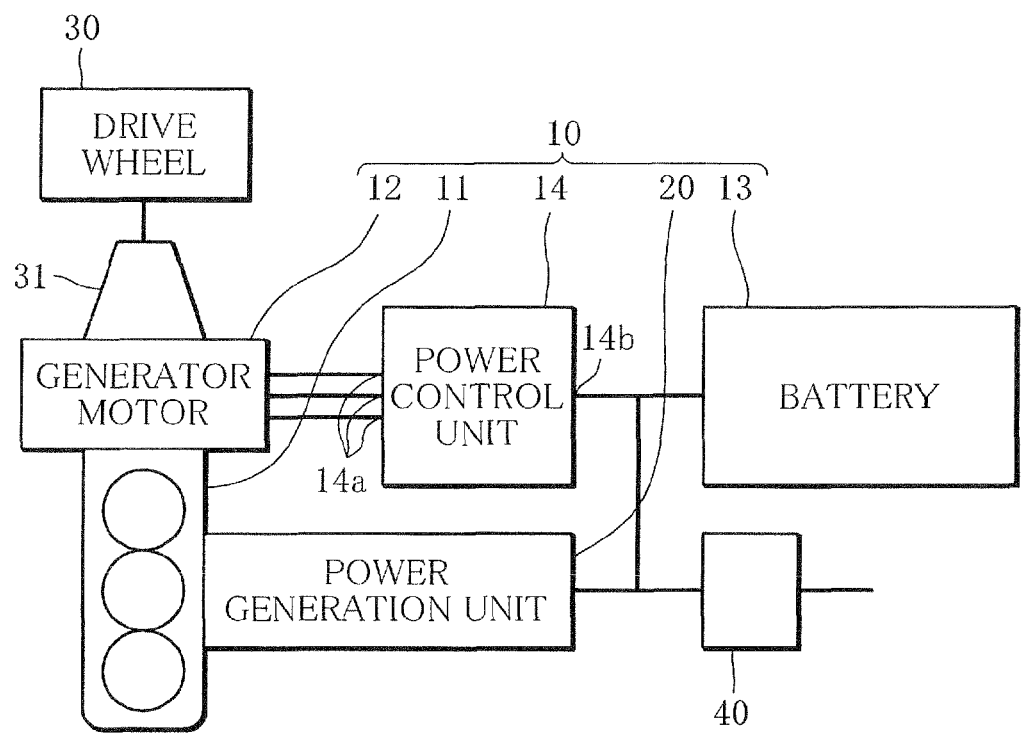
FIG. 1 is a diagram showing one example of the schematic configuration of a drive apparatus according to one embodiment of the present invention.

FIG. 1 is a diagram showing one example of the schematic configuration of a drive apparatus 10. The drive apparatus 10 whose details will be given later has an engine 11 which is the power source of a vehicle, a generator motor 12 coupled to the output shaft of the engine 11 and a drive wheel 30, a battery 13, a power control unit 14, and a power generation unit 20 disposed in an exhaust gas passage 21 of the engine 11. The rotational shaft of the generator motor 12 has only to be coupled to the output shaft of the engine 11 via an arbitrary power transmission unit, and is not particularly limited as long as it is coupled to the drive wheel 30 via an arbitrary power transmission unit. In the embodiment, the output shaft of the engine 11 is coupled to the rotational shaft of the generator motor 12 via a mechanical power transmission unit. The drive wheel 30 is coupled to the rotational shaft of the generator motor 12 via a transmission 31.

Therefore, the engine 11 drives the generator motor 12 when the generator motor 12 operates as a generator, and drives the drive wheel 30 via the transmission 31. The generator motor 12 when operating as a motor receives electric power supplied from the battery 13, and drives the drive wheel 30 together with the engine 11 via the transmission 31. The drive wheel 30 drives the generator motor 12, which operates as a generator, via the transmission 31.

The power control unit 14 has a first port 14a connected to the generator motor 12, and a second port 14b connected to the battery 13. Therefore, the generator motor 12 when operating as a generator charges the battery 13 through the power control unit 14. The generator motor 12 when operating as a motor receives electric power supplied from the battery 13 through the power control unit 14. Further, the power generation unit 20 is electrically connected to the battery 13 to charge the battery 13, and, together with the battery 13, supplies electric power to the generator motor 12 when the generator motor 12 operates as a motor.

When the battery 13 has a plurality of low-voltage battery cells connected in series to provide an output voltage (charge voltage) of, for example, 144 volts, a step-down unit 40 for supplying electric power to electrical devices which operate on a low voltage (e.g., 12 volts) is needed (FIG. 1). FIG. 1 exemplarily shows a plurality of drive wheels by one drive wheel 30, and the single drive wheel is not restrictive.

<Power Generation Unit>

Figure 2:
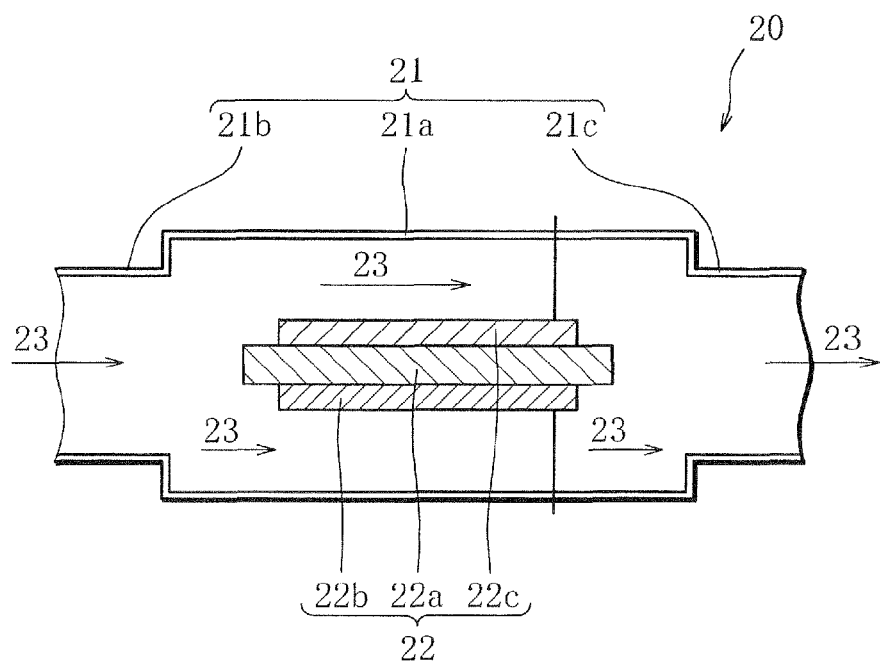
FIG. 2 is a diagram showing one example of the schematic configuration of a power generation unit used in the drive apparatus shown in FIG. 1.

The power generation unit 20 shown in FIG. 2 is a single cell type solid oxide fuel cell formed by disposing a solid oxide fuel cell 22 (hereinafter, referred to as fuel cell 22) in the exhaust gas passage 21. The exhaust gas passage 21 has a main passage 21a which accommodate the fuel cell 22 and in which a combusted exhaust gas 23 flows, an inlet part 21b which leads the combusted exhaust gas 23 exhausted from the engine 11 to the main passage 21a, and a discharge part 21c which discharge the combusted exhaust gas 23 having flowed through the main passage 21a. The fuel cell 22 has a solid oxide electrolyte 22a formed in, for example, a rectangular flat shape, and has an air electrode 22b formed on one surface of the solid oxide electrolyte 22a and a fuel electrode 22c formed on the other surface of the solid oxide electrolyte 22a.

The solid oxide electrolyte 22a is formed of, for example, 8-mol-YSZ (yttria stabilized zirconia), 5-mol-YSZ, SDC (scandium doped ceria), GDC (gadolinium doped ceria), ScSZ (scandia stabilized zirconia) or the like. The air electrode 22b is formed of, for example, LSM (lanthanum strontium manganite), LSC (lanthanum strontium cobaltite) or the like. The fuel electrode 22c is formed of, for example, NiO+YSZ, NiO+SDC, NiO+GDC, LSCM (lanthanum strontium cobalt manganite), $FeO_3$, or the like.

The combusted exhaust gas 23 contains CHx, COx, Air, etc. When the combusted exhaust gas 23 in a high-temperature state of, for example, 500 to 1000° C. is supplied to the exhaust gas passage 21, the fuel cell 22 is heated to a temperature equal to or higher than a power generation start temperature. At this time, oxygen ions ($O^{2-}$) are generated at the air electrode 22b from the air (Air) in the combusted exhaust gas 23. The oxygen ions generated this way move inside the solid oxide electrolyte 22a of the fuel cell 22 from the air electrode 22b to the fuel electrode 22c, and react with CHx or COx contained in the combusted exhaust gas 23 at the fuel electrode 22c to generate carbon dioxide ($CO_2$) or water ($H_2O$). When an electric load (not shown) is connected between the air electrode 22b and the fuel electrode 22c, electrons which are carried by the oxygen ions flow to the air electrode 22b (positive electrode) from the fuel electrode 22c (negative electrode). The air electrode 22b and fuel electrode 22c may be formed by depositing conductors on the respective surfaces of the solid oxide electrolyte 22a.

The power generation unit 20 generates electric power using the combusted exhaust gas 23 in this manner. The power generation unit 20 discharge carbon dioxide or water (vapor) chemically converted from CHx or COx contained in the combusted exhaust gas 23 by the fuel cell 22. Therefore, the power generation unit 20 can purify the combusted exhaust gas 23. The power generation unit 20 may be configured to have a plurality of fuel cells 22 connected in serial parallel, so that the output voltage of the power generation unit 20 matches with the charge voltage of the battery 13. Alternatively, the power generation unit 20 may have its output boosted to the charge voltage of the battery 13 by means of an unshown voltage booster.

<Operation of Drive Apparatus>

Figure 3:
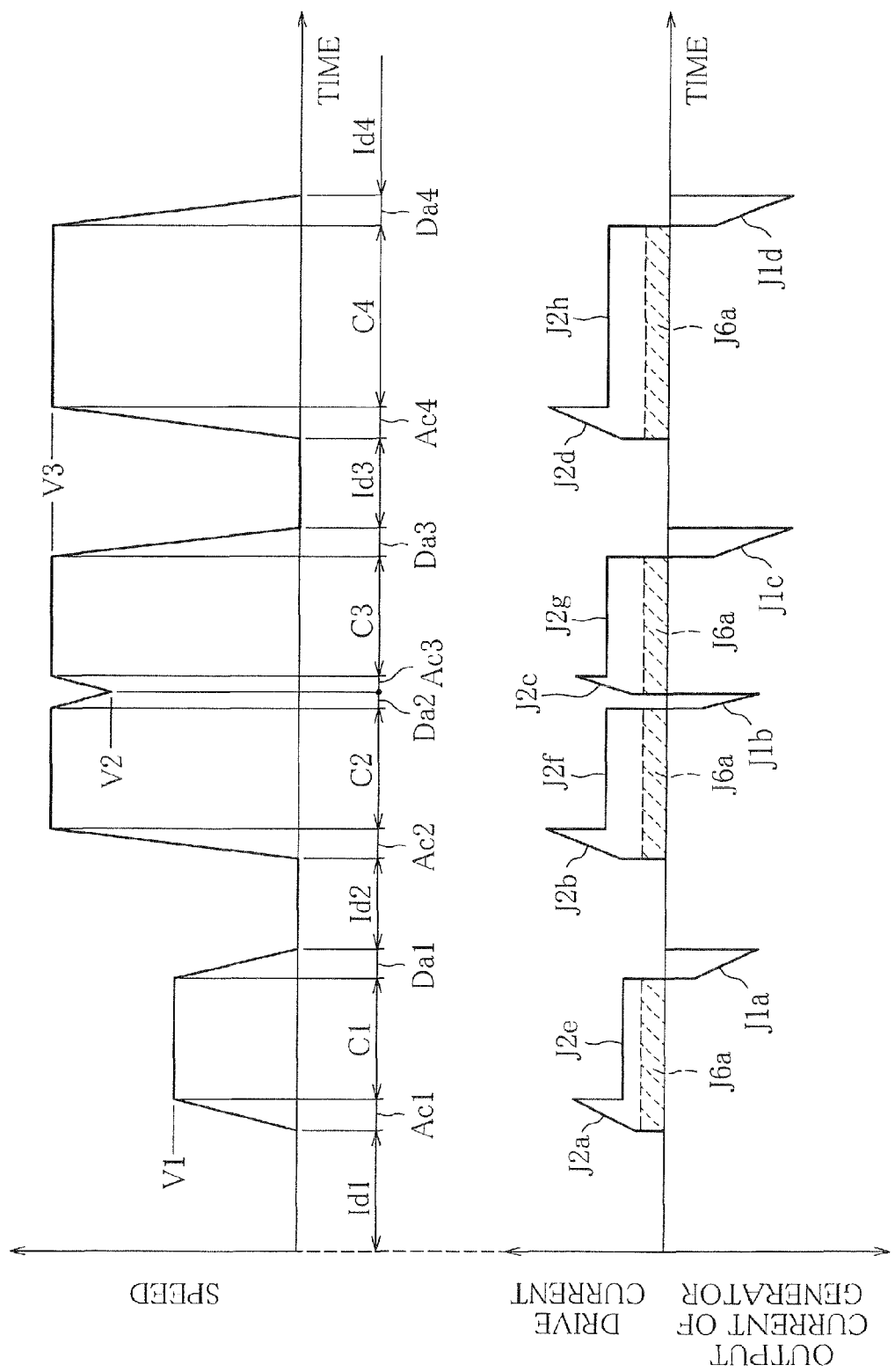
FIG. 3 is a diagram illustrating the relationship between the output current and drive current of a generator motor in each operational state of a vehicle having the drive apparatus shown in FIG. 1.

The operation of the drive apparatus 10 will be described with reference to FIGS. 3, 4A, 4B, 4C and 4D. FIG. 3 is a diagram illustrating the output current and drive current of the generator motor in each operational state of the vehicle having the drive apparatus 10 mounted therein. FIG. 4A, FIG. 4B, FIG. 4C and FIG. 4D are diagrams illustrating the currents of the generator motor 12, the battery 13, the power generation unit 20, etc. respectively at the time the vehicle decelerates, at the time the vehicle accelerates, at the time the vehicle runs, and at the time the vehicle is idling. In those diagrams, J1 is the output current of the generator motor 12 when operating as a generator, J2 is the drive current of the generator motor 12 when operating as a motor, J3 is the charge current of the battery 13, J4 is the discharge current of the battery 13, J5 is the consumption current of the step-down unit 40, and J6 is the output current of the power generation unit 20.

The power control unit 14 operates on the electric power supplied from the step-down unit 40. It is assumed that the current that flows into the first port 14a is entirely output from the second port 14b. Further, it is assumed that the current that flows into the second port 14b of the power control unit 14 is entirely output from the first port 14a. It is also assumed that the voltage drop between the first port 14a and the second port 14b is negligible.

<At Deceleration Time>

In FIG. 3, individual periods indicated by Da1 to Da4 are periods in which the vehicle having the drive apparatus 10 mounted therein is decelerating with the regenerative braking. At the deceleration period Da1, the vehicle is decelerated from a speed V1 to a speed zero (stop). At the deceleration period Da2, the vehicle is decelerated from a speed V3 to a speed V2. Then, at the deceleration periods Da3 and Da4, the vehicle is decelerated from the speed V3 to the speed zero (stop).

Figure 4A:
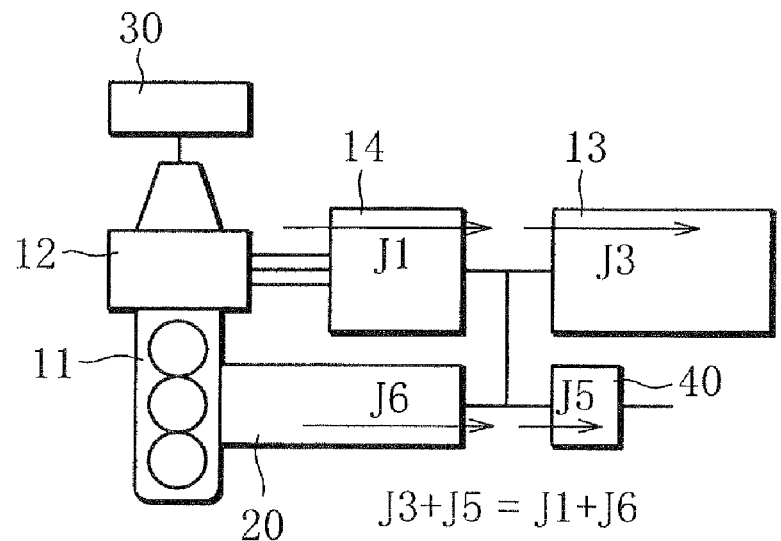
FIG. 4A is a diagram illustrating the operations of the generator motor, battery, power generation unit, etc. in the drive apparatus shown in FIG. 1 and currents flowing in them at the time of deceleration of the vehicle.

In those deceleration periods Da1 to Da4, the drive apparatus 10 selects the charge mode. Then, as shown in FIG. 4A, the output current J1 (regenerative output currents J1a to J1d included in FIG. 3) of the generator motor 12 (generator) which is output via the power control unit 14 covers the consumption current J5 of the step-down unit 40 while charging the battery 13 (charge current J3) together with the output current J6 of the power generation unit 20 (i.e., J3+J5=J1+J6). Therefore, the battery 13 can store greater electric power. That is, the battery 13 can supply greater electric power to the generator motor 12 when the generator motor 12 operates as a generator.

When the deceleration of the vehicle is gentle, the output current J1 of the generator motor 12 (generator) becomes smaller. That is, the maximum values of the output currents J1a and J1b become smaller than the maximum values of the output currents J1c and J1d as shown in FIG. 3.

<At Acceleration Time>

In FIG. 3, individual periods indicated by Ac1 to Ac4 are periods in which the drive apparatus 10 is accelerating the vehicle. At the acceleration period Ac1, the drive apparatus 10 accelerates the vehicle from the speed zero (stop) to the speed V1. At the acceleration period Act, the drive apparatus 10 accelerates the vehicle from the speed zero (stop) to the speed V3. Next, the drive apparatus 10 accelerates the vehicle from the speed V2 to the speed V3 at the acceleration period Ac3, and accelerates the vehicle from the speed zero (stop) to the speed V3 at the acceleration period Ac4.

Figure 4B:
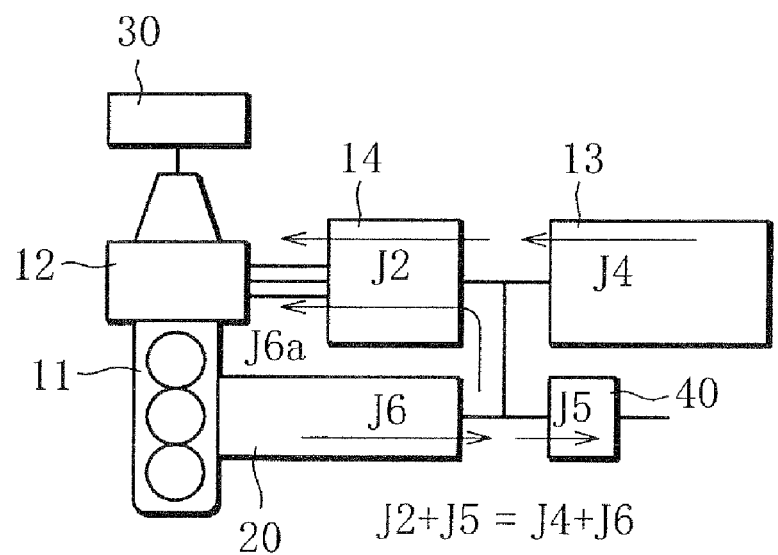
FIG. 4B is a diagram illustrating the operations of the generator motor, battery, power generation unit, etc. in the drive apparatus shown in FIG. 1 and currents flowing in them at the time of acceleration of the vehicle.

At the acceleration periods Ac1 to Ac4, the drive apparatus needs to drive the drive wheel 30 with greater drive power. At this time, the drive apparatus 10 makes the generator motor 12 operate as a motor to supplement the output of the engine 11 in such a way that the engine 11 is operated at low fuel consumption and with less harmful substances in the combusted exhaust gas 23. The drive apparatus 10 selects the assist mode at the time of acceleration. As shown in FIG. 4B, therefore, the drive current J2 (drive currents J2a to J2d in FIG. 3) of the generator motor 12 operating as a motor and the consumption current J5 of the step-down unit 40 are covered by the discharge current J4 of the battery 13 and the output current J6 of the power generation unit 20, respectively (i.e., J2+J5=J4+J6).

Note that the drive currents J2a to J2d needed by the generator motor 12 operating as a motor at the time of acceleration are mostly supplied from the battery 13. Part (J6a) of the output current J6 of the power generation unit 20 covers part of the drive currents J2a to J2d. Therefore, the drive apparatus for a vehicle according to the present invention can reduce the power consumption of the battery 13 (FIGS. 3 and 4B). That is, with the power consumption reduced in this manner, the battery 13 can drive the generator motor 12 operating as a motor for a longer time.

When the acceleration is rapid, the drive current J2 of the generator motor 12 operating as a motor becomes larger. That is, the maximum values of the drive currents J2b and J2d become larger than the maximum values of the drive currents J2a and J2c as shown in FIG. 3.

Even in a case where the power control unit 14 has selected the charge mode, however, if the total current of the output current J1 of the generator motor 12 operating as a generator and the output current J6 of the fuel cell is smaller than the consumption current J5 of the step-down unit 40, the battery 13 is not charged.

In the present embodiment, the situation in which the output current J1 of the generator motor 12 (generator) is let to flow to the battery 13 is defined as the charge mode.

<At Running Time>

Figure 4C:
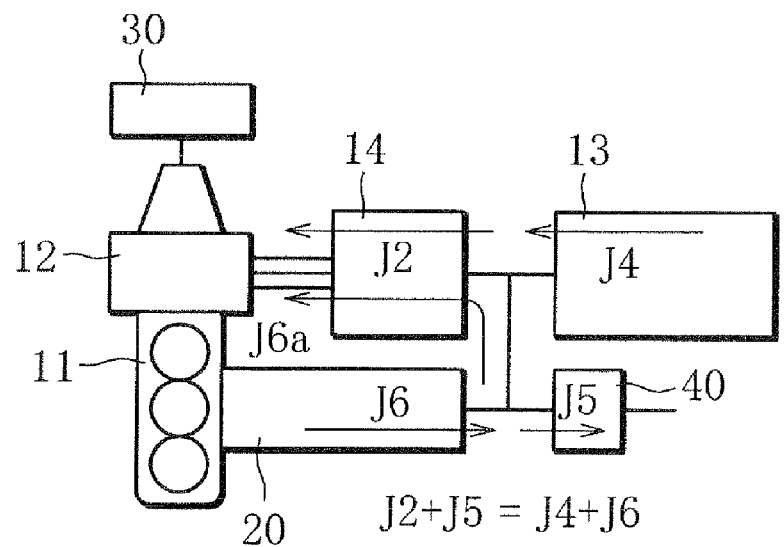
FIG. 4C is a diagram illustrating the operations of the generator motor, battery, power generation unit, etc. in the drive apparatus shown in FIG. 1 and currents flowing in them at the time of running of the vehicle.

In FIG. 3, a period indicated by C1 is a period where the drive apparatus 10 causes the vehicle to run at a low speed. During the low-speed running period C1, the vehicle secures the drive power to keep running by the output of the generator motor 12 operating as a motor in addition to the output of the engine 11. At this time, the drive apparatus 10 selects the assist mode. As shown in FIG. 4C, therefore, the drive current J2 (drive current J2e in FIG. 3) of the generator motor 12 (motor) operating as a motor and the consumption current J5 of the step-down unit 40 are respectively covered by the discharge current J4 of the battery 13 and the output current J6 of the power generation unit 20 (i.e., J2+J5=J4+J6). In this manner, the power generation unit 20 supplies the consumption current J5 to the step-down unit 40 while covering the drive current J2 (J6a in FIGS. 3 and J6a in FIG. 4C) together with the battery 13. Therefore, the drive apparatus for a vehicle according to the present invention can reduce the power consumption of the battery 13.

Next, in FIG. 3, periods indicated by C2 to C4 are periods where the drive apparatus 10 causes the vehicle to run at an intermediate speed to a high speed. During the intermediate-speed to high-speed running periods C2 to C4, the output of the engine 11 is supplemented with the output of the generator motor 12 operating as a motor in order for the vehicle to secure larger drive power than the drive power at the low-speed running for keeping running. At this time, therefore, the drive apparatus 10 also selects the assist mode. In other words, the power generation unit 20 supplies the consumption current J5 to the step-down unit 40 while covering the drive current J2 (drive currents J2f to J2h in FIG. 3) together with the battery 13. Therefore, the drive apparatus 10 can reduce the power consumption of the battery 13.

When the vehicle runs with inertia or the like even during the running period, however, the drive apparatus 10 need not select the assist mode. When the output of the engine 11 becomes greater than the output needed to drive the vehicle, such as when the vehicle runs on a downhill, the drive apparatus 10 can select the charge mode.

<At Idling Time>

Figure 4D:
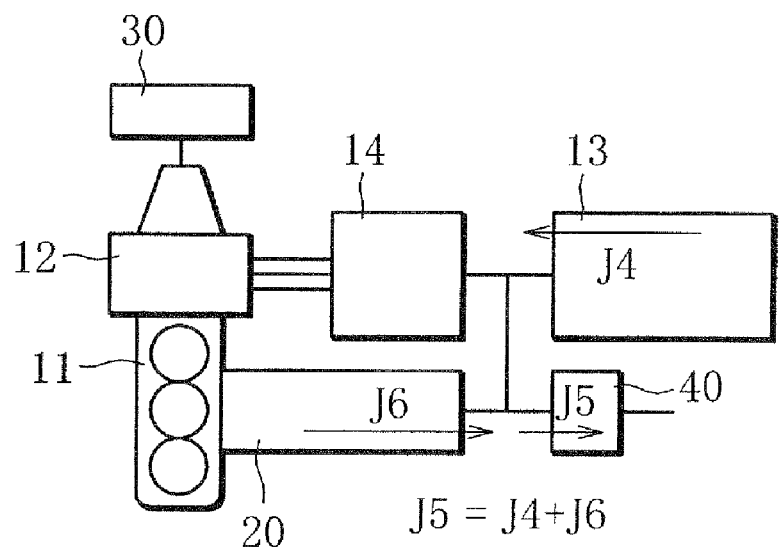
FIG. 4D is a diagram illustrating the operations of the generator motor, battery, power generation unit, etc. in the drive apparatus shown in FIG. 1 and currents flowing in them at the time of idling of the vehicle.

In FIG. 3, periods indicated by Id1 to Id4 are periods where the vehicle has stopped and the drive apparatus 10 is idling. During the idling periods Id1 to Id4, the engine 11 is operated at a relatively low speed. This makes it difficult to charge the battery 13 with the generator motor 12 operating as a generator. As shown in FIG. 4D, however, the output current J6 of the power generation unit 20 supplements the discharge current J4 of the battery 13 and supplies the consumption current J5 of the step-down unit 40 (i.e., J5=J4+J6). Therefore, the power generation unit 20 can reduce the power consumption of the battery 13 in the idling periods Id1 to Id4. At the time of idling, the drive apparatus 10 normally selects neither the charge mode nor the assist mode. That is, the first port 14a and the second port 14b of the power control unit 14 are electrically disconnected from each other. It is to be noted that the battery 13 can be charged with the power generation unit 20 even during the idling periods Id1 to Id4 if the consumption power of unshown electric devices mounted in the vehicle is reduced or the power generating performance of the power generation unit 20 is enhanced.

<Control by Power Control Unit>

Figure 5:
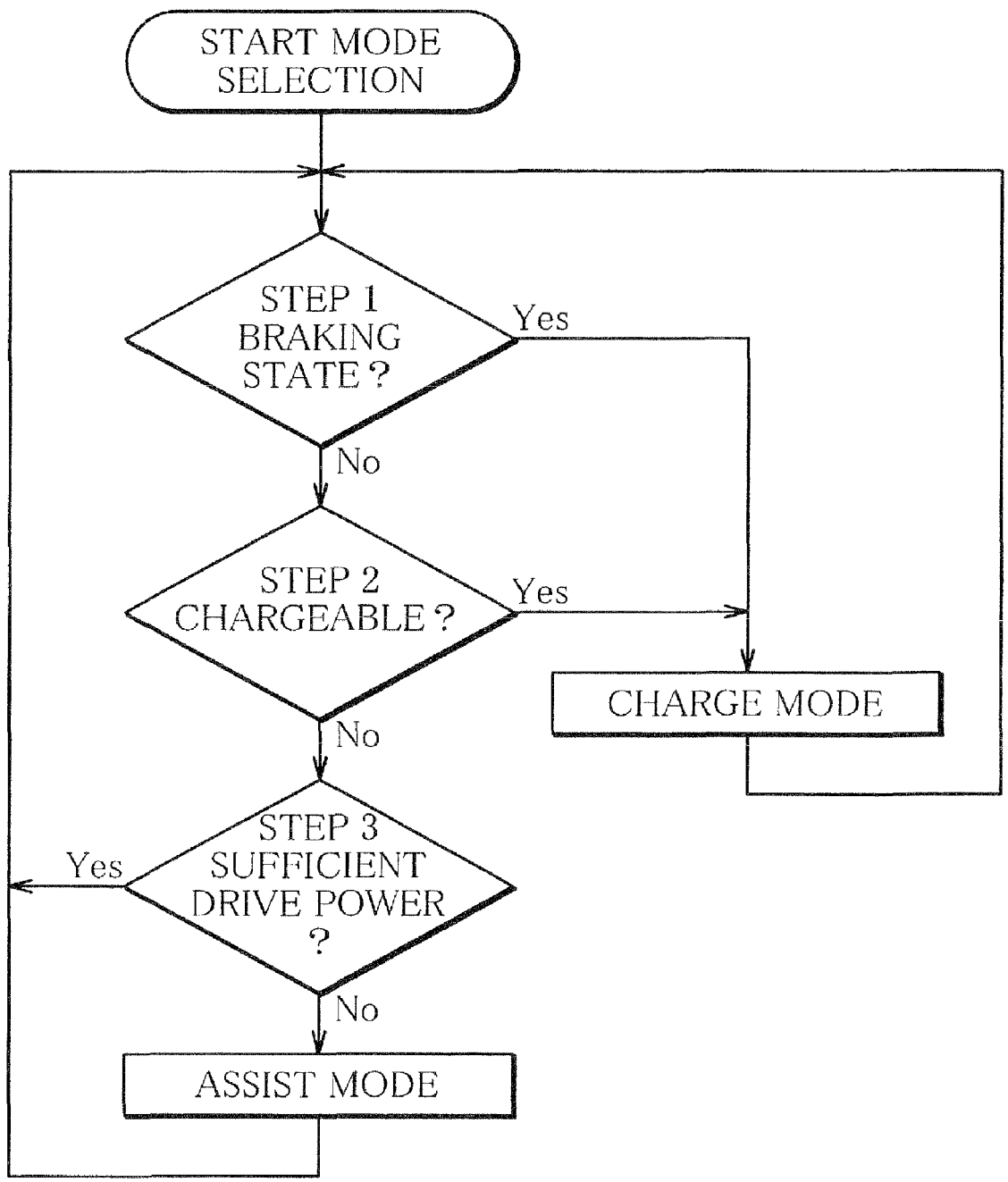
FIG. 5 is a flowchart illustrating procedures of determining the individual operational states of the drive apparatus shown in FIG. 1.

FIG. 5 is a flowchart illustrating procedures of determining the operational state of the vehicle having the drive apparatus 10 mounted therein and selecting the charge mode or the assist mode. Upon reception of information on the operational state from a control computer (not shown) mounted in the vehicle, the power control unit 14 selects the mode. When the vehicle is activated, the drive apparatus 10 starts selecting the charge mode or the assist mode (start mode selection in FIG. 5).

First, the power control unit 14 determines whether the vehicle is in a braking state (decelerating state) (step 1). When the power control unit 14 determines in step 1 that the vehicle is in the braking state (Yes in step 1), the power control unit 14 selects the charge mode to operate the generator motor 12 as a generator, feeds the output current J1 of the generator motor 12 (generator) to the second port 14b from the first port 14a to charge the battery 13, and returns the procedure to step 1. When the power control unit 14 determines in step 1 that the vehicle is not in the braking state (No in step 1), the power control unit 14 advances the procedure to step 2.

Next, the power control unit 14 determines in step 2 whether the engine 11 is generating an output equal to or greater than the output that is needed to drive the vehicle (i.e., whether it is chargeable). When the power control unit 14 determines in step 2 that it is chargeable (Yes in step 2), the power control unit 14 selects/keeps the charge mode, and then returns the procedure to step 1. When the power control unit 14 determines in step 2 that it is not chargeable (No in step 2), the power control unit 14 advances the procedure to step 3.

In this step 3, the power control unit 14 determines whether driving of the vehicle is sufficiently achieved by the output of the engine 11 (i.e., whether the drive power is enough). When the power control unit 14 determines in step 3 that the drive power is enough (Yes in step 3), the power control unit 14 returns the procedure to step 1. When the power control unit 14 determines in step 3 that the drive power is not enough (No in step 3), the power control unit 14 selects the assist mode. Then, the power control unit 14 connects the battery 13 and the power generation unit 20 to the generator motor 12 to supply the drive current J2 to the generator motor 12 operating as a generator, and returns the procedure to step 1.

The case where the power control unit 14 determines that the drive power is insufficient is when the vehicle speed drops even though, for example, the driver does not perform the deceleration manipulation. When the operation of the engine 11 is stopped, the power control unit 14 disconnects the electric connection between the first port 14a and the second port 14b.

As described above, the power control unit 14 selects the charge mode or the assist mode as needed. That is, even if the power control unit 14 keeps the assist mode, the power generation unit 20 charges the battery 13. Therefore, the battery 13 can supply greater electric power to the generator motor 12 (motor), and achieve reduction in fuel consumption and reduction in the total amount of the combusted exhaust gas.

<Modification of Power Generation Unit>

Figure 6:
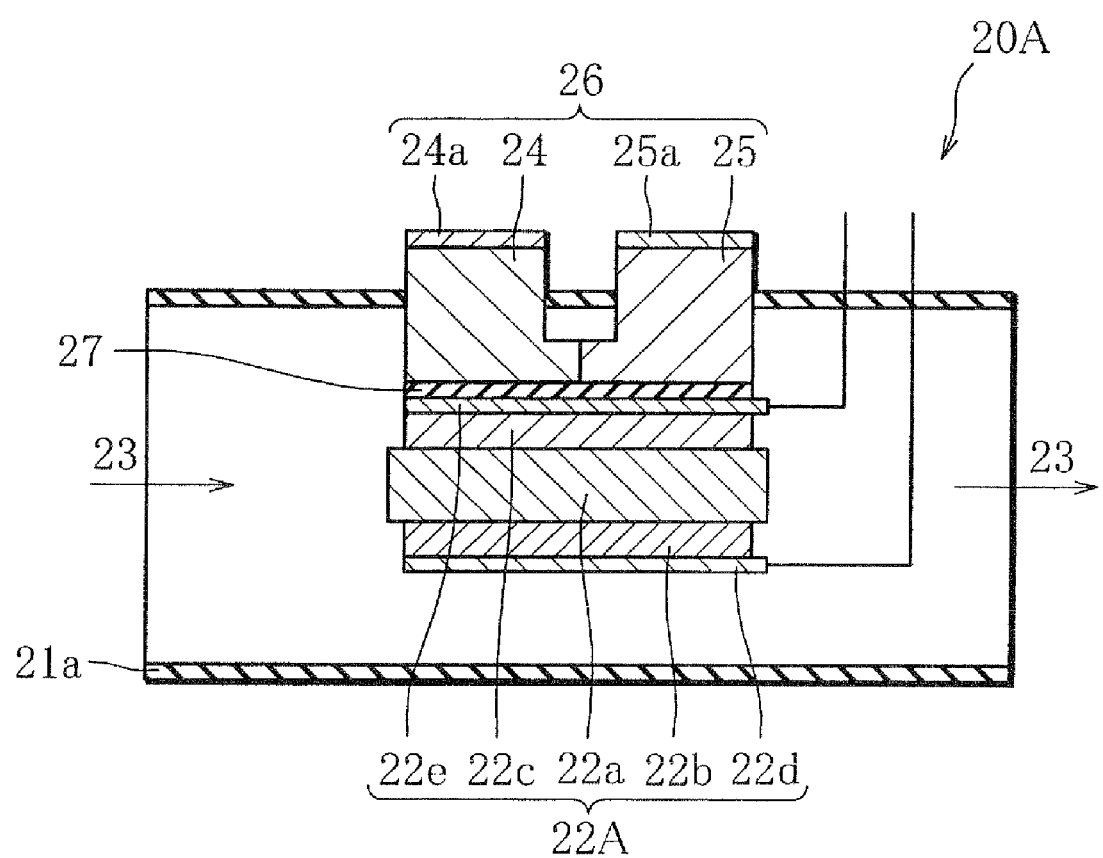
FIG. 6 is a diagram showing the schematic configuration of a modification of the power generation unit.

FIG. 6 shows a modification of the power generation unit or a power generation unit 20A which includes a fuel cell 22A and heat generating device 26. The power generation unit 20A has a positive electrode 22d formed on the top surface of the air electrode 22b, and a negative electrode 22e formed on the top surface of the fuel electrode 22c. The heat generating device 26, which is configured by connecting a P type thermoelectric transducing member 24 and an N type thermoelectric transducing member 25, is in contact with the negative electrode 22e via an electric insulating layer 27. In FIG. 6, 24a is a P material electrode and 25a is an N material electrode.

With an electric load (not shown) connected between the P material electrode 24a and N material electrode 25a, the heat generating device 26 generates electric power due to the Seebeck effect. As mentioned above, the fuel cell 22A is accommodated in the main passage 21a of the exhaust gas passage 21 to constitute a single cell type solid oxide fuel cell, and generates electric power with the combusted exhaust gas used as a fuel gas. The heat generating device 26 is heated by the heat energy of the combusted exhaust gas and the reaction heat at the fuel electrode 22c of the fuel cell 22A to carry out the Seebeck-effect based power generation. That is, each of the fuel cell 22A and the heat generating device 26 of the power generation unit 20A generates electric power.

The heat generating device 26 may contact the air electrode 22b of the fuel cell 22A through the electric insulating layer 27. The heat generating device 26 can generate electric power with the heat energy of the combusted exhaust gas even not in contact with the fuel cell 22A. Further, even if the power generation unit 20A comprises only the heat generating device 26, the power generation unit 20A can charge the battery 13. Therefore, the battery 13 can supply greater electric power to the generator motor 12 (motor), thus achieving reduction in fuel consumption and reduction in the total amount of the combusted exhaust gas.

The present invention is not limited to the foregoing embodiment, and can be modified as needed without departing from the subject matter thereof.

<Four-Wheel Drive Vehicle>

Figure 7:
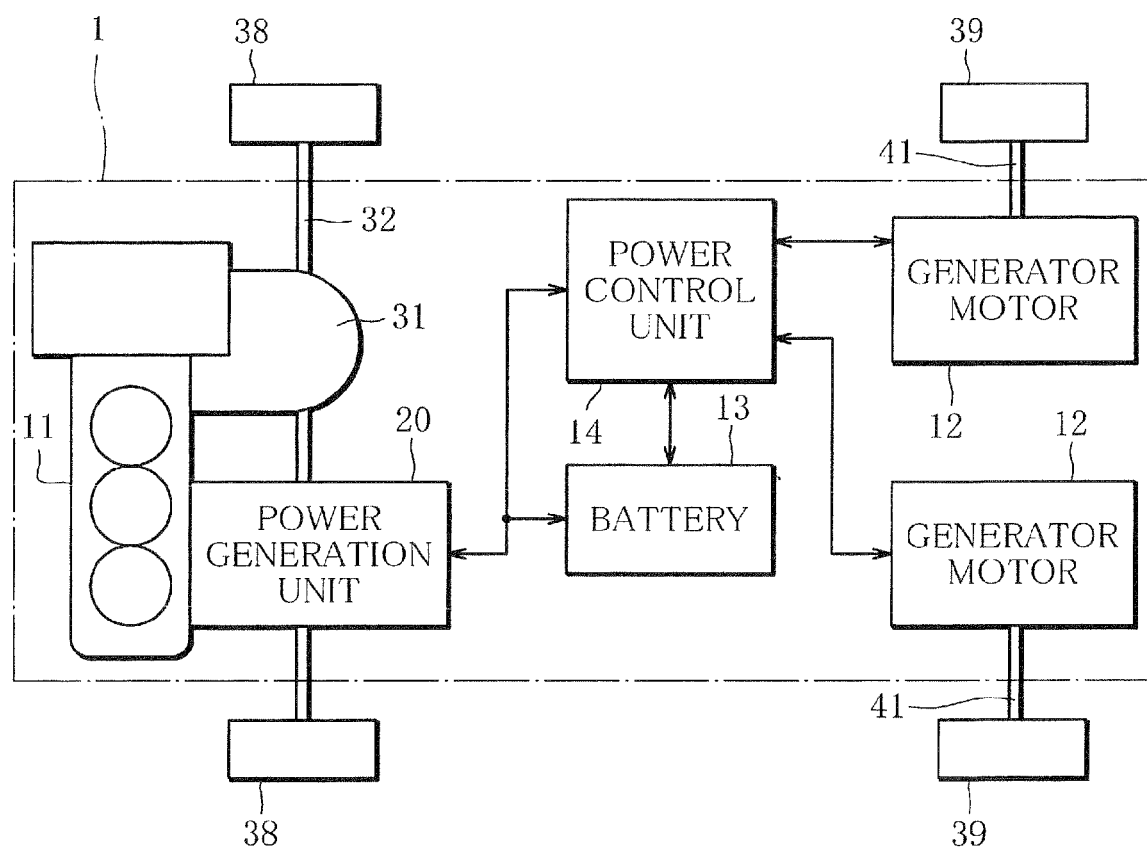
FIG. 7 is a diagram showing the schematic configuration of a four-wheel drive vehicle to which the drive apparatus according to the present invention is adapted.

For example, the drive apparatus for a vehicle according to the present invention can be adapted to a four-wheel drive vehicle (4WD vehicle) as shown in FIG. 7. In FIG. 7, same reference numerals are given to the components which are the same as those of the embodiment and descriptions thereof are omitted.

This four-wheel drive vehicle 1 has a couple of front wheels 38 rotated and driven by the engine 11 via the transmission 31 and a front-wheel drive shaft 32. Meanwhile, the four-wheel drive vehicle 1 has rear wheels 39 rotated and driven by the generator motors 12 via a rear-wheels drive shafts 41 respectively.

As mentioned above, each of the generator motors 12 receives electric power supplied from the battery 13 in assist mode, and each of the rear wheels 39 is driven by the corresponding generator motor 12 operating as a motor. When the four-wheel drive vehicle 1 is in a braking state (decelerating state), the power control unit 14 operates in charge mode. At this time, the power control unit 14 stores the electric power generated by the generator motors 12, each of which is rotated and driven by the corresponding rear wheels 39 to operate as a generator, in the battery 13.

The four-wheel drive vehicle 1 has the power generation unit 20 disposed in the exhaust gas passage 21 of the engine 11, and is configured to charge the battery 13 with electric power generated with a high-temperature exhaust gas flowing in the exhaust gas passage 21 (not shown in FIG. 7).

Therefore, the four-wheel drive vehicle (4WD vehicle) to which the drive apparatus for a vehicle according to the present invention is adapted can charge the battery 13 with electric power acquired from the combusted exhaust gas by the power generation unit 20 disposed in the exhaust gas passage of the engine 11 even when the generator motor 12 is not in a power generating state and cannot charge the battery 13, such as when the generator motor 12 operating as a motor is assisting the engine 11.

In addition, as described in the foregoing description of the embodiment, the four-wheel drive vehicle to which the drive apparatus for a vehicle according to the present invention is adapted can supply greater electric power from the battery to the motor in assist mode, thus making it possible to achieve further reduction in fuel consumption and further reduction in the total amount of the combusted exhaust gas.

Further, as the power generation unit 20 employing a single cell type solid oxide fuel cell, or the power generation unit 20 employing a single cell type solid oxide fuel cell and Seebeck-effect based heat generating means is used as the power generation unit 20, it is possible to achieve reduction in fuel consumption and reduction in the total amount of the combusted exhaust gas even with a simple configuration.

This four-wheel drive vehicle may be configured in such a way that the front wheels 38 are rotated and driven by the generator motors 12, while the rear wheels 39 are rotated and driven by the engine 11.

<Three-Wheeled Vehicle>

Figure 8:
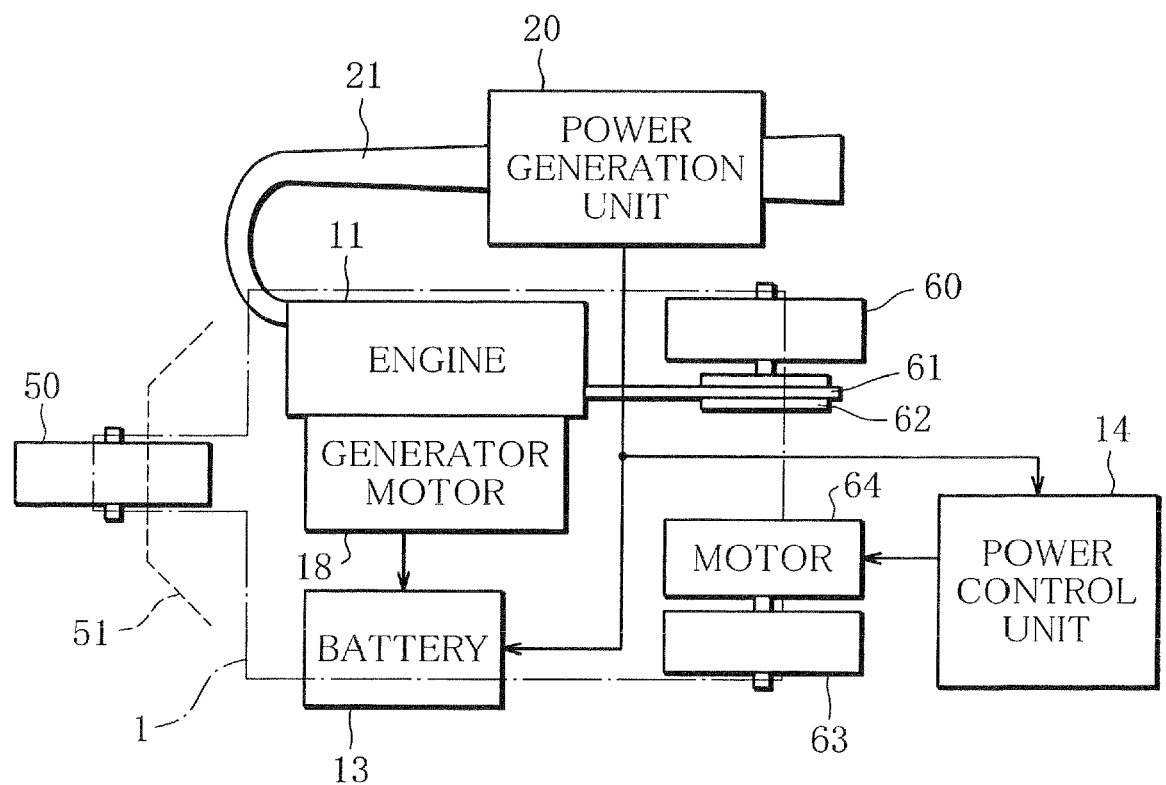
FIG. 8 is a diagram showing the schematic configuration of a three-wheeled vehicle to which the drive apparatus according to the present invention is adapted.

Next, another embodiment of the present invention will be described. This embodiment differs from the above-described embodiment in that the drive apparatus for a vehicle according to the present invention is adapted to a three-wheeled vehicle having a steered wheel 50 which sets the moving direction of the vehicle and a couple of drive wheels 60, 63 as shown in FIG. 8. In FIG. 8, same reference numerals are given to the components which are the same as those of the embodiment and descriptions thereof are omitted.

In the embodiment, the steered wheel 50 is interlocked with a steering bar 51 which is operated by the driver of the vehicle 1 to set the moving direction of the vehicle 1. The drive wheel 60 is driven by a gear 61 attached to the rotational shaft of the drive wheel 60 and a chain 62 which engages with the gear 61 to transmit the power generated by the engine 11. The other drive wheel 63 is coupled to a motor 64 which is connected to the drive shaft of the drive wheel 63 to rotate the drive wheel 63.

The battery 13 is charged by a generator 18 which is coupled to the engine 11 and generates electric power due to the rotational drive power of the engine 11.

In addition, the power generation unit 20 which generates electric power with the high-temperature exhaust gas flowing in the exhaust gas passage 21 and charges the battery 13 with the generated electric power is provided in the exhaust gas passage 21 of the engine 11. Therefore, the battery 13 is charged with the electric power generated by the power generation unit 20 besides the generator 18.

The motor 64 is driven with the electric power stored in the battery 13 to rotate the drive wheel 63. At this time, the motor 64 which rotates and drives the drive wheel 63 is controlled by the power control unit 14 in such a way as to keep the same rotational speed as that of the other drive wheel 60 which is rotated and driven by the engine 11.

Therefore, the three-wheeled vehicle to which the drive apparatus for a vehicle according to the present invention is adapted allows the power generation unit 20 disposed in the exhaust gas passage 21 of the engine 11 to acquire electric power from the combusted exhaust gas and charge the battery 13, and allows the motor 64 to supplement the output of the engine 11, thus making it possible to achieve reduction in fuel consumption and reduction in the total amount of the combusted exhaust gas.

<Two-Wheeler>

Figure 9:
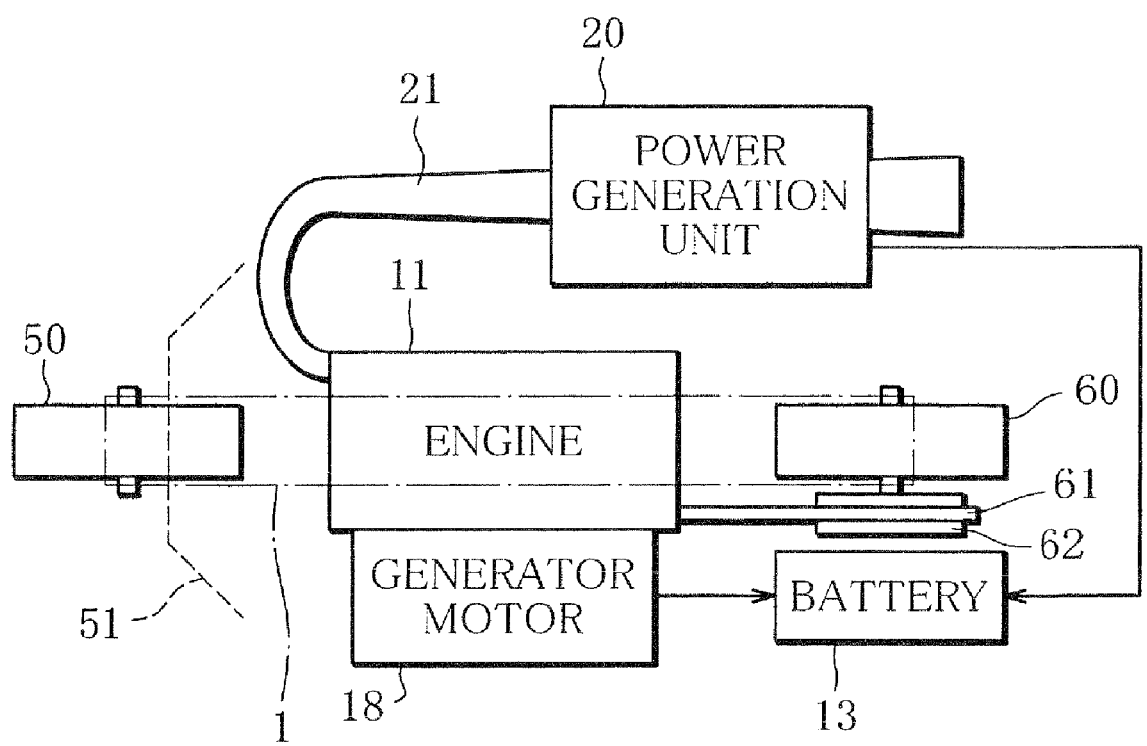
FIG. 9 is a diagram showing the schematic configuration of a two wheeler to which the drive apparatus according to the present invention is adapted.

Alternatively, the drive apparatus for a vehicle according to the present invention may be configured in such a way that as shown in FIG. 9, the power generation unit 20 is attached to an ordinary two-wheeler and generates electric power with the high-temperature exhaust gas flowing in the exhaust gas passage 21 to charge the battery 13. Note that same reference numerals are given to the components which are the same as those of the embodiment and descriptions thereof are omitted.

The power generation unit 20 is attached to the exhaust gas passage 21 of the engine 11 in the two-wheeler. The drive apparatus may be configured so that the electric power of the generator 18 which is driven by the rotation of the engine 11 to generate electric power, and the electric power generated by the power generation unit 20 are stored in the battery 13. The drive apparatus for a vehicle according to the present invention which has such a configuration can acquire electric power from the combusted exhaust gas by means of the power generation unit 20 disposed in the exhaust gas passage 21 of the engine 11 to charge the battery 13, and can thus bring about practically significant effects, such as effective reuse of the energy which is exhausted as the combusted exhaust gas.

The invention claimed is:

1. A drive apparatus for a vehicle, comprising:
an engine to be coupled to a drive wheel of the vehicle to generate drive power for the vehicle;
a generator motor to be coupled to an output shaft of the engine and the drive wheel;
a battery;
a power control unit which selects one of: (i) a charge mode in which the generator motor is operated as a generator to charge the battery with electric power generated by the generator motor, and (ii) an assist mode in which electric power is supplied to the generator motor from the battery, and the generator motor is operated as an electric motor to supplement an output of the engine; and
a power generation unit which is electrically connected to the battery and the power control unit, and which has a fuel cell which is disposed in an exhaust gas passage of the engine to generate electric power using only combusted exhaust gas of the engine as fuel;
wherein the power generation unit comprises a heat generating device which comprises a junction portion where one end portion of a P type thermoelectric transducing member and one end portion of an N type thermoelectric transducing member are connected, and generates electric power with a Seebeck effect;
wherein the junction portion is associated with the fuel cell in the exhaust gas passage; and
wherein another end portion of the P type thermoelectric transducing member and another end portion of the N type thermoelectric transducing member are located outside the exhaust gas passage.

2. The drive apparatus for a vehicle according to claim 1, wherein:
the power control unit selects the charge mode when the vehicle is braked and when the engine generates an output equal to or greater than an output needed to drive the vehicle, and
the power control unit selects the assist mode when the output of the engine is less than the output needed to drive the vehicle.

3. The drive apparatus for a vehicle according to claim 1, wherein the fuel cell comprises a single cell type solid oxide fuel cell.

4. The drive apparatus for a vehicle according to claim 1, wherein:
the vehicle comprises a four-wheel drive vehicle, and
one of a couple of front drive wheels or a couple of rear drive wheels are driven by the engine, and the other couple of drive wheels are driven by the generator motor.

5. The drive apparatus for a vehicle according to claim 2, wherein:
the vehicle comprises a four-wheel drive vehicle, and
one of a couple of front drive wheels or a couple of rear drive wheels are driven by the engine, and the other couple of drive wheels are driven by the generator motor.

6. The drive apparatus for a vehicle according to claim 1, wherein:
the vehicle comprises a three-wheeled vehicle having a steered wheel which sets a moving direction of the vehicle, and a couple of drive wheels, and
one of the couple of drive wheels is driven by the engine, and the other one of the drive wheels is driven by the generator motor.

7. The drive apparatus for a vehicle according to claim 2, wherein:
the vehicle comprises a three-wheeled vehicle having a steered wheel which sets a moving direction of the vehicle, and a couple of drive wheels, and
one of the couple of drive wheels is driven by the engine, and the other one of the drive wheels is driven by the generator motor.

8. The drive apparatus for a vehicle according to claim 1, wherein the vehicle comprises a two-wheeler having a steered wheel which sets a moving direction of the vehicle, and a drive wheel.

9. The drive apparatus according to claim 2, wherein the vehicle comprises a two-wheeler having a steered wheel which sets a moving direction of the vehicle, and a drive wheel.

* * * * *